United States Patent [19]
Kurosaki

[11] Patent Number: 4,934,889
[45] Date of Patent: Jun. 19, 1990

[54] NUT TYPE PLASTIC FASTENER
[75] Inventor: Mutsuo Kurosaki, Yokohama, Japan
[73] Assignee: NIFCO, Inc., Yokohama, Japan
[21] Appl. No.: 382,352
[22] Filed: Jul. 20, 1989
[51] Int. Cl.⁵ .................. F16B 37/08; F16B 39/36
[52] U.S. Cl. ............................. 411/433; 411/267; 411/512; 411/908; 411/935
[58] Field of Search ............... 411/182, 267, 427, 433, 411/437, 935, 907, 908, 512

[56] References Cited
U.S. PATENT DOCUMENTS

| | | | |
|---|---|---|---|
| 2,814,324 | 11/1957 | Shur | 411/267 |
| 4,671,717 | 6/1987 | Fukuhara | 411/437 |
| 4,828,444 | 5/1989 | Oshida | 411/437 |

Primary Examiner—Neill R. Wilson
Attorney, Agent, or Firm—Schwartz & Weinrieb

[57] ABSTRACT

A nut type plastic fastener has a vertical penetrating space and a plurality of holding pieces facing one another with the space. The facing surfaces of the holding pieces are provided with ridges for engagement with threads of a stud. The lower portions of the holding pieces are connected by means of small-thickness flexible pieces to the lower portion of the fastener body defining the space. When a stud is passed through a gap defined between the holding pieces, the holding pieces are separated from one another as a result of the flexing of the flexible pieces.

8 Claims, 2 Drawing Sheets

FIG. 1
FIG. 2
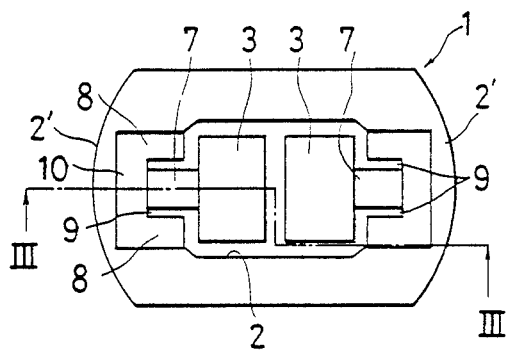
FIG. 4
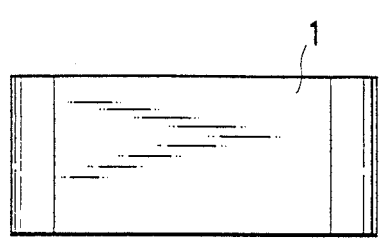
FIG. 3
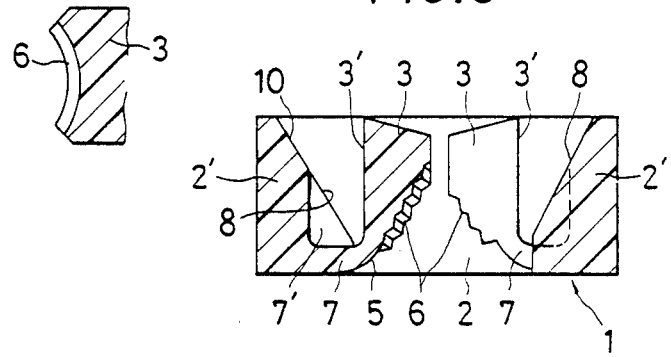
FIG. 5
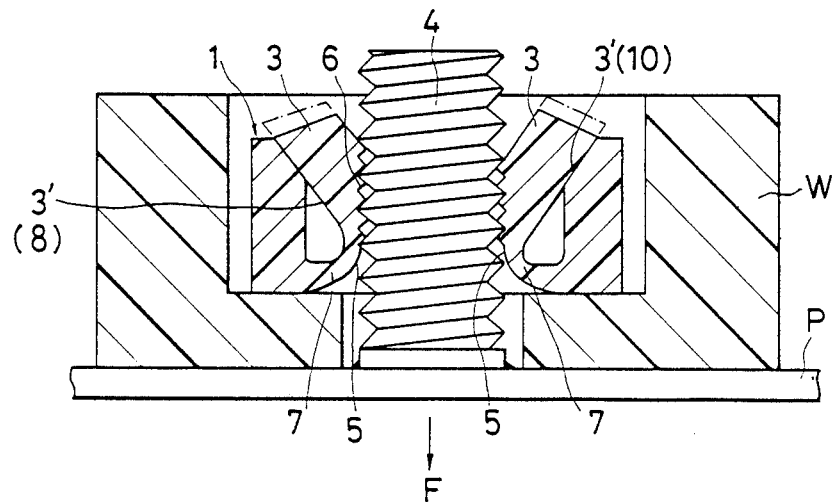

NUT TYPE PLASTIC FASTENER

FIELD OF THE INVENTION

This invention relates to a nut type plastic fastener for removable mounting upon a stud projecting outwardly from a panel or the like by axially pushing the fastener onto the stud.

DESCRIPTION OF THE PRIOR ART

Japanese Utility Model Publication No. 60-23549 discloses a nut type plastic fastener which comprises a body having a vertically hollow portion and a plurality of holding pieces facing one another within the hollow portion and adopted to be flexed away from one another when a stud is passed through a portion of the space defined between the holding pieces.

In this prior art nut type plastic fastener, the holding pieces extend upright from the lower end of the body adjacent to the hollow portion without the aid of any reduced-thickness portion. Therefore, a large force is required for mounting the fastener upon the stud by pushing it in the axial direction of the stud with its space, defined by means of the holding pieces, aligned with the free end of the stud due to relatively large bending or flexure forces inherent in the holding pieces which must be overcome. Furthermore, the holding pieces have smooth surfaces facing one another. Therefore, in the mounted state of the fastener upon the stud, only low friction is produced between the threads of the stud and the mating surfaces of the holding pieces, and a mounted workpiece is liable to come loose.

OBJECT OF THE INVENTION

An object of the invention is to provide a nut type plastic fastener which only requires a small force for mounting it upon a stud but nevertheless exhibits high mounting strength after mounting upon the stud, and which also effectively prevents loosening or separation from the stud.

SUMMARY OF THE INVENTION

According to the invention, there is provided a nut type plastic fastener which comprises a body having a vertically penetrating space and a plurality of holding pieces facing one another within the space, wherein the pieces have their facing surfaces provided with the ridges for engagement with threads of the stud and also have their lower portions united with a lower end portion of the body defining the space by means of small-thickness flexible pieces, the walls of the body behind the holding pieces being provided with inclined support portions for engaging the back surfaces of the holding pieces when the holding pieces are flexed away from one another as a result of the fastener being mounted upon the stud.

Thus, when the fastener is pushed against the stud with the free end of the stud aligned with the space defined by means of the holding pieces of the fastener, the holding pieces are separated from one another by flexing of the flexible pieces, so that the fastener can be readily mounted upon the stud. Furthermore, in the mounted state of the fastener, the holding pieces are moved upwardly so as to provide a downwardly acting biasing force. Thus, the mounted fastener can be loosened only with difficulty.

BRIEF DESCRIPTION OF THE DRAWINGS

The above and other objects and features of the invention will become more apparent from the following detailed description with reference to the accompanying drawings, in which like reference characters designate like or corresponding parts throughout the several views, and wherein:

FIG. 1 is a front view showing a first embodiment of the nut type plastic fastener constructive according to the invention;

FIG. 2 is a plan view showing the fastener of FIG. 1;

FIG. 3 is a sectional view taken along line III—III in FIG. 2;

FIG. 4 is a fragmentary enlarged-scale sectional view showing a holding piece of the fastener of FIG. 1;

FIG. 5 is a sectional view showing the fastener of FIG. 1 in use; and

DETAILED DESCRIPTION OF THE PREFERRED EMBODIMENTS

Figure 6:
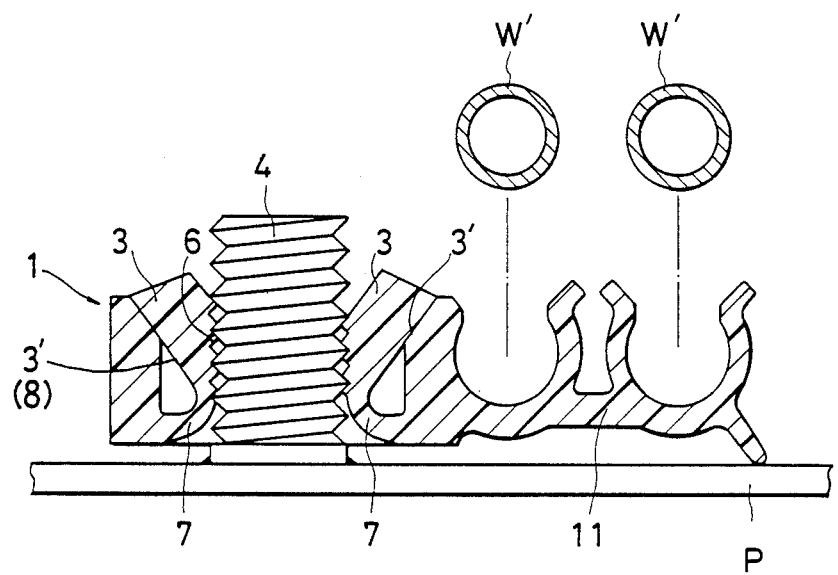
FIG. 6 is a sectional view showing a second embodiment of the nut type plastic fastener constructed according to the invention in use.

FIGS. 1 to 5 show a first embodiment of the nut type plastic fastener constructed according to the invention. Reference numeral 1 designates a body of the nut type plastic fastener. The body 1 has a space 2 vertically penetrating it and a pair of upright holding pieces 3 opposing each other within the space 2. When a stud 4 is passed through the gap defined between the holding pieces 3, as shown in FIG. 5, the holding pieces 3 are flexed away from each other. This fastener is axially mounted upon the stud 4 projecting upwardly from a member P so as to enable mounting of a workpiece W upon the member P. The body 1 has a predetermined thickness. In this embodiment, it has an oval outer shape (see FIG. 2). However, the body may be of a polygonal, for instance hexagonal, outer shape. Furthermore, three or more holding pieces in lieu of the two holding pieces 3 may be adopted.

The pair of holding pieces 3 have respective inclined surfaces 5 facing each other. The inclined surfaces 5 have arcuate ridges 6, as shown in FIG. 4, which mesh with threads formed upon the outer periphery of the stud 4. The holding pieces 3 have their lower portions united to lower portions of opposed end walls 2' of the body 1 at the opposite ends of the space 2 by means of small-thickness flexible pieces 7 having a smaller width than that of the holding pieces 3 as can be clearly seen from FIG. 2.

The end wall 2' at each end of the space 2, to which the associated holding piece 3 is united by means of one of the flexible pieces 7, is provided with a pair of inclined support portions 8 spaced apart by means of a slit 9 and disposed upon the opposite sides of the flexible piece 7 for engaging the back surface 3' of the holding piece 3 when the holding piece 3 is flexed away from the other holding piece 3, as shown in FIG. 5 once the fastener is mounted upon the stud 4. Upper portions of the pair of inclined support portions 8 upon the opposite sides of each flexible piece 7 are united with each other by means of a central inclined portion 10 of each end wall 2' wherein each portion 10 has the same inclination as that of its respective portions 8. A space defined between the central inclined portion 10 and the back surface 3' of each holding piece, that is, an upper portion of each flexible piece 7, constitutes an escapement space 7'.

As is clearly shown in the plan view of FIG. 2, each pair of inclined support portions 8 and associated central inclined portion 10 define a channel-shaped arrangement, and the associated flexible piece 7 and holding piece 3 are coupled at the bottom of the channel-shaped arrangement.

In use, the opposed sides of the holding pieces 3 engage the upper end of the stud 4 as the fastener is to be mounted upon the stud 4, which is of a predetermined diameter, and in this state the fastener is pushed against the stud 4. As a result, the pair of holding pieces 3 are separated from each other by means of the flexing of the flexible portions 7, and their back surfaces 3' abut against the central inclined portions 10 of the inclined support portions 8. Since the escapement gap 7' is defined above each flexible piece 7, each holding piece 3 exerts an upward force upon the associated flexible piece 7 and its back surface 3' is guided along the inclined support portion 8 and central inclined portion 10, as shown by means of the broken lines in FIG. 5. As a result, the gap within which the stud 4 is disposed and clamped is widened, and the ridges 6 upon the inclined surfaces 5 of the pair of holding pieces 3 clear the threads of the stud 4 as the fastener is moved relatively downwardly with respect thereto so as to attain the mounted state as shown in FIG. 5. It will be appreciated that the fastner can be readily mounted upon the stud 4 by applying a small downward force.

When the mounted state is attained, the pair of holding pieces that have stretched themselves along surfaces 8 and 10 are elastically restored in an inclined downward direction along surfaces 8 and 10, and the ridges 6 upon the inclined surfaces 5 are engaged with the threads of the stud 4. Furthermore, the holding pieces 3 have their back surfaces 3' supported upon the inclined support portions 8 and central inclined portions 10 and are thus secured to the stud 4 by means of a wedging action, so that they will not become loose even if one or both of the flexible pieces 7 should break or fracture.

When the stud 4 experiences a force tending to withdraw it downwardly from the fastener (as shown by means of the arrow F in FIG. 5), the pair of holding pieces 3 with their back surfaces 3' in contact with the inclined support portions 8 and central inclined portions 10 are pulled downwardly along the inclined surfaces, causing the ridges 6 to wedge more firmly into the flanks of the stud 4 more so as to reliably prevent downward displacement of the stud 4.

In order to dismount the workpiece W, the body 1 is turned with a tool in an unscrewing direction, that is, in the same way as with an ordinary nut.

It will be understood from FIG. 5 that when the depth of the valley between adjacent ridges 6 of each holding piece 3 is set smaller than the height of the thread of the stud 4, the ridges 6 can readily clear the threads of the stud in the axial direction, so that it is possible to mount the fastener with a reduced force. Furthermore, reducing the depth of the valley between adjacent ridges 6 can increase the number of the ridges 6. Therefore, it is possible for the threads of the stud 4 to engage in alternate valleys between adjacent ridges 6 as illustrated in FIG. 5 so as to ensure reliable engagement of the ridges 6 with the threads of the stud 4. In this embodiment the ridges 6 are provided substantially over the entire opposed surfaces of the holding pieces, but this is by no means limitative, and it is possible to provide ridges in a dispersed fashion.

FIG. 6 shows a second embodiment of the nut type constructed according to the invention. This embodiment is different from the first embodiment in that body 1 is provided with an integral workpiece holder 11 for holding different workpieces W'. In this embodiment, the workpiece holder has C-shaped portions for receiving or accommodating workpieces W' such as, for example, pipes or conduits. However, this is by no means limitative, and any type of workpiece holder may be provided, so long as it has a shape complementary to workpieces W' to be mounted. This fastener can be mounted upon a stud 4 projecting outwardly from a member P so that the workpieces W' may be mounted upon the member P.

As has been described in the foregoing, according to the invention it is possible to provide a nut type plastic fastener which can be mounted upon a stud by axially pushing the fastener with a small force but which nevertheless exhibits a very high mounting strength and is free from loosening or separation.

Obviously, many modifications and variations of the present invention are possible in light of the above teachings. It is therefore to be understood that within the scope of the appended claims, the present invention may be practiced otherwise than as specifically described herein.

What is claimed is:

1. A nut type plastic fastener, for cooperative mounting upon a threaded stud, comprising:
    a body having an axially extending penetrating space defined therethrough;
    a plurality of holding pieces, facing one another within said space, having ridges defined thereon for engaging threaded portions of said threaded stud when said threaded stud is inserted within said space and between said holding pieces as said fastener is mounted upon said stud;
    flexible pieces integrally connecting said holding pieces to said body for permitting said holding pieces to flex away from each other when said stud is inserted within said space and between said holding pieces; and
    inclined surface portions defined upon said body at a predetermined angle with respect to the axis of said axially extending penetrating space of said body for engaging said holding pieces when said holding pieces are flexed away from each other when said stud is inserted within said space and between said holding pieces so as to limit the extent to which said holding pieces are flexed away from each other and thereby cause said holding pieces to be disposed in wedged contact with said stud.

2. The nut type plastic fastener according to claim 1, wherein said body has its inclined surface portions disposed behind said holding pieces for receiving the back surfaces of said holding pieces when said holding pieces are flexed away from one another.

3. The nut type plastic fastener according to claim 1, wherein said axis of said axially extending penetrating space extends vertically, said holding pieces extend upright, and said facing surfaces provided with said ridges are inclined.

4. The nut type plastic fastener according to claim 1, in which an escapement space for permitting escapement of each one of said flexible pieces therein is provided above each one of said flexible pieces.

5. The nut type plastic fastener according to claim 1, wherein each end wall of said body having one of said holding pieces united thereto via one of said flexible pieces is provided with a pair of said inclined support portions spaced apart by means of a slit and disposed upon opposite sides of each one of said flexible pieces for receiving the back surface of the associated holding piece when said holding pieces are flexed away from one another.

6. A nut type plastic fastener as set forth in claim 1, wherein:
   said body has a substantially planar surface for engaging a workpiece and for cooperating with a support panel, upon which said threaded stud is mounted, for fixing said workpiece upon said support panel wherein said workpiece is interposed between said substantially planar surface of said body and said support panel.

7. A nut type plastic fastener as set forth in claim 1, further comprising:
   a workpiece holder integrally formed and connected to said body for accommodating workpieces.

8. A nut type plastic fastener as set forth in claim 7, wherein said workpiece holder comprises:
   at least one substantially U-shaped member for accommodating at least one elongated rod-type workpiece.

* * * * *